US007977565B1

(12) United States Patent
Lye

(10) Patent No.: US 7,977,565 B1
(45) Date of Patent: Jul. 12, 2011

(54) VIBRATION APPARATUS AND METHOD FOR SEASONING STRINGED MUSICAL INSTRUMENTS

(75) Inventor: Agapitus B. Lye, Gainesville, FL (US)

(73) Assignee: Tonerite, Inc., Gainesville, FL (US)

( * ) Notice: Subject to any disclaimer, the term of this patent is extended or adjusted under 35 U.S.C. 154(b) by 0 days.

(21) Appl. No.: 12/508,687

(22) Filed: Jul. 24, 2009

Related U.S. Application Data

(63) Continuation-in-part of application No. 12/063,553, filed on Feb. 11, 2008, now Pat. No. 7,678,987.

(60) Provisional application No. 61/083,406, filed on Jul. 24, 2008.

(51) Int. Cl.
*G10H 3/00* (2006.01)
*G01D 3/02* (2006.01)

(52) U.S. Cl. .......................................... 84/723; 84/294

(58) Field of Classification Search ................ 84/297 R, 84/294, 453, 723
See application file for complete search history.

(56) References Cited

U.S. PATENT DOCUMENTS

| | | | | |
|---|---|---|---|---|
| 4,860,625 | A * | 8/1989 | Mathews | 84/731 |
| 4,867,027 | A * | 9/1989 | Barbera | 84/731 |
| 5,031,501 | A | 7/1991 | Ashworth | |
| 5,537,908 | A * | 7/1996 | Rabe et al. | 84/454 |
| 5,847,297 | A * | 12/1998 | Fisher, IV | 84/313 |
| 5,945,622 | A * | 8/1999 | Yamada | 84/731 |
| 7,227,068 | B1 * | 6/2007 | Van Doren | 84/297 R |
| 7,453,040 | B2 * | 11/2008 | Gillette | 84/723 |
| 2007/0175320 | A1 * | 8/2007 | Hall et al. | 84/723 |

FOREIGN PATENT DOCUMENTS

| | | |
|---|---|---|
| DE | 551 820 | 6/1932 |
| DE | 44 15 816 | 11/1995 |
| FR | 2 501 885 | 9/1982 |

OTHER PUBLICATIONS

Supplementary European Search Report dated Oct. 13, 2008, pp. 1-3.

* cited by examiner

*Primary Examiner* — Jeffrey Donels
(74) *Attorney, Agent, or Firm* — Allen Dyer Doppelt Milbrath & Gilchrist

(57) ABSTRACT

Apparatus and method for seasoning stringed musical instruments comprises an electric vibration generator coupled to a string cradle. The string cradle is detachably attachable to the strings of the instrument through a plurality of flanges extending between the strings.

17 Claims, 3 Drawing Sheets

VIBRATION APPARATUS AND METHOD FOR SEASONING STRINGED MUSICAL INSTRUMENTS

CROSS REFERENCE TO RELATED APPLICATIONS

This application is a continuation-in-part of application Ser. No. 12/063,553 filed Aug. 10, 2006 and also claims priority from Provisional Application Ser. No. 61/083,406 filed Jul. 24, 2008. The entirety of both applications are incorporated herein by reference.

FIELD OF THE INVENTION

This invention relates to apparatus and methods for improving the sound quality of stringed musical instruments.

BACKGROUND

It is known that certain stringed musical instruments play their best after a certain "play in" period following instrument fabrication. Examples of such musical instruments include wood-bodied instruments such as the violin, viola, cello, guitar, bass guitar, and mandolin. Many believe that these types of musical instruments need to be played daily to sound their best. Because a "played in" instrument is preferable over one that is not, and because the time necessary to achieve sufficient "play in" can be substantial, a way of simulating the "playing in" of such instruments is needed. A way of automating instrument "play in" is also needed.

SUMMARY OF THE INVENTION

The present invention meets the needs of those who play and deal with stringed musical instruments, and more specifically wood-bodied stringed musical instruments, by providing an apparatus and method for simulating the "play in" period of a musical instrument in a way that keeps the musical instrument in good performing condition. When used appropriately, this invention reduces or eliminates the need for "playing in" a stringed musical instrument. This is accomplished by simulating the vibration that occurs during the "play in" period. This "playing in" and simulation of "playing in" the stringed musical instrument will be collectively referred to herein as "seasoning" the instrument.

One embodiment of the invention is an apparatus comprising an electric vibration generator and a string cradle coupled to the electric vibration generator. The string cradle is detachably attachable to at least one, and preferably all, of the strings of the instrument and further comprises a plurality of spaced-apart, elongated finger-like projections referred to in a non-limiting way as "flanges," with a groove between adjacent flanges. The dimension of each groove between each pair of adjacent flanges is sufficient to accommodate at least one, and preferably two, strings of the instrument when the string cradle is placed in sufficient contact with the one or more strings to permit the transfer of vibrations generated by the vibration generator to season the instrument. In one specific arrangement, the sides of each groove are angled outwardly from the outer extremity of the flange, and contain elongated indentations for gripping the associated string fitted along either side of the flange. In another specific arrangement, at least one of the leading edges of each flange is tapered to make better contact with the bridge of the instrument if it is desired to make contact with the bridge.

This invention also contemplates a method for seasoning a stringed musical instrument comprising attaching to the strings of the instrument a vibration generator with a string cradle coupled with the vibration generator. The string cradle is detachably attachable to one or more strings of the instrument and further comprises a plurality of spaced-apart, elongated flanges with a groove between adjacent flanges. The dimension of each groove is sufficient to accommodate at least one string of the instrument when the string cradle is placed spaced apart from the bridge of the stringed musical instrument in sufficient contact with one or more strings to permit the transfer of vibrations generated by the vibration generator.

These and other embodiments, advantages, and features of this invention will be apparent from the following description, accompanying drawings, and appended claims.

DETAILED DESCRIPTION

Figure 1:
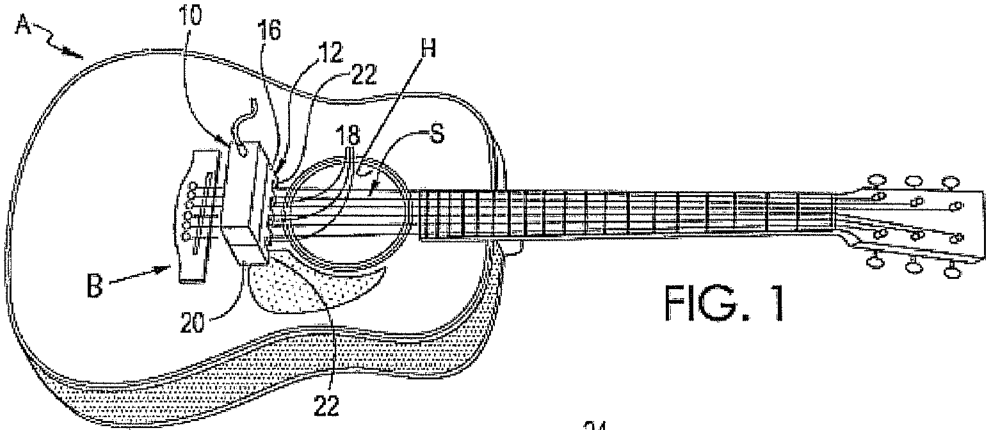
FIG. 1 is a perspective view of an apparatus representing a first embodiment of the present invention attached to the strings of a stringed musical instrument.

The apparatus and methods of this invention apply to stringed musical instruments, and more specifically wood-bodied stringed musical instruments. More particularly, the apparatus of this invention can be used with such stringed musical instruments that have a fundamental frequency range in the range of about 30 Hz to about 3500 Hz. Wood-bodied stringed musical instruments to which this invention applies include, but are not limited to, violins, violas, cellos, basses, guitars, bass guitars, and mandolins, all of which include a bridge located distal to the neck where the strings are attachable to the stringed musical instrument.

The vibration generator can be configured to accept electric current from any of a variety of sources including a 60 Hz alternating current or batteries. An external source of electric current is described in the particular embodiments herein. The power source can be connected to the electric vibration generator via one or more wires so that the power source is not in contact with the musical instrument. A power switch may be part of the electric vibration generator. An electric vibration generator with a power switch is preferred.

The vibrations in the electric vibration generator can be generated using any of a variety of mechanisms which are known in the art, including for example linear vibrators, rotary vibrators, and electro-magnetic vibrators which employ an electromagnet coupled to a permanent magnet on an arm (in which the permanent magnet vibrates as a result of the current that flows through the electromagnet, creating vibration), and the like. Any power source can be used, but in the particular embodiments herein, electrical power, especially AC electrical current, is employed. In one particular embodiment, the electric vibration generator is an electromagnetic vibrator connectable to a source of AC electric current. In another particular embodiment, the electric vibration generator is an offset DC motor.

Typically, the string cradle is detachably attachable to the strings of a stringed musical instrument. The string cradle includes a plurality of spaced-apart, elongate flanges with a groove between adjacent flanges. The distance between each set of adjacent flanges is sufficient to accommodate at least one string of the instrument when the string cradle is placed in sufficient contact with the one or more strings to permit the transfer of vibrations generated by the vibration generator into the one or more strings of the instrument. The string cradle is constructed from a material that can effectively transmit the vibrations from the vibration generator to the musical instrument. Rubber is a preferred material for the string cradle, but other suitable materials may include plastic, wood, or metal.

In one embodiment, the string cradle comprises a main body portion and two side walls extending from the main body portion, each of the side walls forming a plurality of spaced-apart, elongate flanges extending from the main body portion, the distance between each set of adjacent flanges being sufficient to accommodate at least one string of the instrument therein when the cradle is placed spaced apart from the bridge of the stringed musical instrument and placed exclusively upon the one or more strings of the musical instrument. In alternate embodiments, the main body portion of the string cradle is arched. When the main body portion of the string cradle is arched, it is preferred that the flanges extend from the concave side of the arched main body portion.

The flanges may have one or more of the following features: they are co-extensive; those in each side wall are equidistantly spaced; those extending from the same side wall are coplanar; those from opposite side walls are directly opposite each other; the end portions extending from the main body portion are beveled; the sides are outwardly tapered; the leading edges are tapered; and each side has an elongated gripping indentation. In some embodiments of this invention, the flanges have at least two of these characteristics; in others, the flanges have all of these characteristics. The string cradle in some embodiments may be characterized in that the main body portion is planar, the flanges extend from the concave side of the arched main body portion, the flanges are co-extensive, the flanges in each side wall are equidistantly spaced, the flanges extending from the same side wall are coplanar, the flanges from opposite side walls are directly opposite each other, and the end portions extending from the main body portion are beveled. In other embodiments, the string cradle further incorporates end members extending from the main body portion and perpendicular to the side walls, with each end member sealably connecting to a flange on each side wall. The electric vibration generator may be attached (or attachable) to the main body portion of the string cradle. Normally, the vibration generator is attached to the string cradle opposite to the part of the string cradle portion that will contact the strings of the stringed musical instrument. The string cradle and the electric vibration generator are attached such that vibrations are effectively transmitted from the vibration generator through the string cradle to the musical instrument. Preferably, when the main body portion of the string cradle is arched, the vibration generator is attached to the string cradle on the convex side of the arched main body portion.

In a second embodiment, an apparatus comprising a string cradle and an electric vibration generator are coupled together as an integral unit, preferably wherein the electric vibration in a non-conductive one-piece, that is preferably fabricated from a rubber-like material. In another embodiment, the portion of the string cradle extending from the housing are coated with a rubber-like material. In at least one arrangement, the string cradle is detachably attachable to the one or more strings of the instrument and further comprises the plurality of spaced-apart, elongate rubber-like flanges. The string cradle may also engage the bridge of the musical instrument. Those skilled in the art having the benefit of this disclosure will realize there are a variety of ways to accomplish the application of the rubber-like housing to the apparatus of the present invention. Alternative housing compositions and coating compositions may include any other material capable of transmitting vibrations including rubber blends, plastic, wood, or metal.

The invention also provides a method for seasoning a stringed musical instrument. As described above, the method comprises i) detachably attaching to the strings of the instrument a string cradle, and ii) actuating the vibration generator so as to generate vibrations along the strings. The vibrations which are generated are transmitted through the string cradle to the musical instrument with an amplitude and frequency which is such that the vibrations simulate those vibrations normally produced when the instrument is played.

The apparatus used in this method for stringed instruments comprises a vibrator capable of transferring vibrations to the strings of the instrument when attached to at least one string in a multitude of manners as long as the manners of attachment allow for the transfer of vibrations to the strings. The vibration generator may comprise an electric vibration generator coupled to a string cradle, the string cradle being detachably attachable to the strings of a stringed musical instrument, the string cradle comprising a plurality of spaced-apart, elongate flanges. The distance between each set of adjacent flanges is sufficient to accommodate at least one string of the instrument when the string cradle is placed spaced apart from the bridge of the stringed musical instrument and placed exclusively upon the one or more strings so that the string cradle is in sufficient contact with the one or more strings to permit the transfer of vibration generated by the vibration generator into the one or more strings of the instrument. In one arrangement, the string cradle comprises two side walls extending from a main body portion, each of the side walls forming a plurality of spaced-apart, elongate flanges extending from the main body portion, the distance between each set of adjacent flanges being sufficient to accommodate a string of the instrument therein when the cradle is placed upon the one or more strings of the musical instrument. Other preferred features used in this method are as described above for the apparatus of the invention comprising a string cradle.

In another arrangement, the elongated flanges of the main body portion of the string cradle grip the strings of the instrument within indentations along faces of each flange to detachably attach the strings to the flanges during seasoning of the instrument. In this manner, one or more strings are placed in contact with one of the elongated flanges to transmit vibrations from the strings into the instrument.

Generally, supplying electricity to the vibration generator actuates the generation of vibrations, and stopping the supply of electricity causes the generation of vibrations to cease. In a particular embodiment, the supply of electricity to the vibration generator is controlled by a power switch. In another particular embodiment, vibrations are generated for a period of time of at least about 30 minutes. In still another particular embodiment, vibrations are generated for a period of time in the range of about 30 minutes to about 60 minutes. In yet another particular embodiment, vibrations are generated for a period of time in the range of about one day to about three days In particular embodiments, the generation of vibrations occurs at least once per day.

The desired power output of the electric vibration generator varies with the stringed musical instrument being seasoned. Non-limiting values for the power outputs for various musical stringed instruments are about 0.5 to about 1 Watt for a violin or a viola; about 1 to about 2.5 W for a cello; about 4 to about 5 W for a bass; about 0.5 to about 1 Watt for a guitar; and about 1 to about 2.5 W for a bass guitar. These power output values are a guide, and values outside these ranges are within the scope of this invention. Typically, the desired frequency of the vibrations of the electronic vibration generator varies with the stringed musical instrument being seasoned. In particular embodiments, non-limiting values for the frequency of the vibrations are about 60 to about 11,000 Hz.

The vibrations generated by the various embodiments may be controlled by connecting the instrument and the electronic vibration generator to a control system which adjusts the vibrations generated by the electronic vibration generator, based on the detection of vibrations generated in the instrument while the generator is operative. The control system may, for example, comprise a detector operatively connected to a processor operatively connected to the electronic vibration generator, the processor being programmed to vary a vibration output generated by the generator in order to achieve and maintain a pre-selected level or range of instrument vibration in the instrument vibration detected by the detector. The processor may be located in an external device such as a personal computer or laptop and linked to the electronic vibration generator via one or more cables or the processor may be located internally in the generator in the form of an embedded microcontroller. The detector may be any commercially available sensor able to measure and quantify vibrations produced within the non-limiting range of about 60 Hz to 11,000 Hz. The sensor may be located in an external device such as a personal computer or laptop and linked to the instrument via one or more cables or the sensor may be attached to the instrument in any manner as long as the sensor does not affect the vibrations generated by the instrument.

The Figures represent particular embodiments, and are not intended to be construed as limiting the invention.

Referring now to the Figures, FIG. 1 is a view of a first embodiment of the invention attached to the strings of a stringed musical instrument A, illustrated as a guitar having strings S, a bridge B and a sound hole H. An electric vibration generator 10 is coupled to a string cradle 12 fitted between the bridge B and sound hole H. One of the side walls 16 of the string cradle 12 is shown. Flanges 18 and 22 extend away from side wall 16, with adjacent flanges 18 separated by groove 17. Each of the end members 20 extends from the main body portion of the string cradle 12 to a flange 18. Flanges 18 extend between the strings of the instrument. Flanges 18 touch the strings of the instrument during seasoning of the guitar A.

Figure 2:
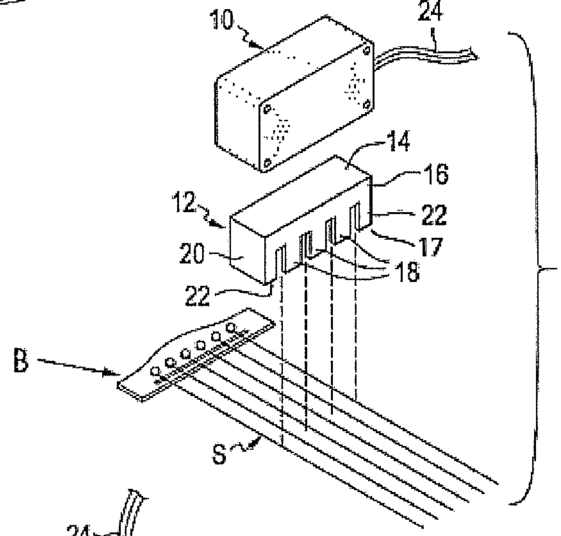
FIG. 2 is an exploded view of an electric vibration generator and a string cradle with the embodiment shown in FIG. 1.

FIG. 2 is a view of the electric vibration generator 10 and string cradle 12 which are not attached to each other for purposes of illustration; they are shown above strings S of the stringed instrument A. The string cradle 12 has a main body portion 14. One of the side walls 16 of the string cradle 12 is shown, with flanges 18 extending away from side wall 16. An electrical power cord 24 extends from the electric vibration generator 10 and is capable of accepting electric current from an external source is shown.

Figure 3:
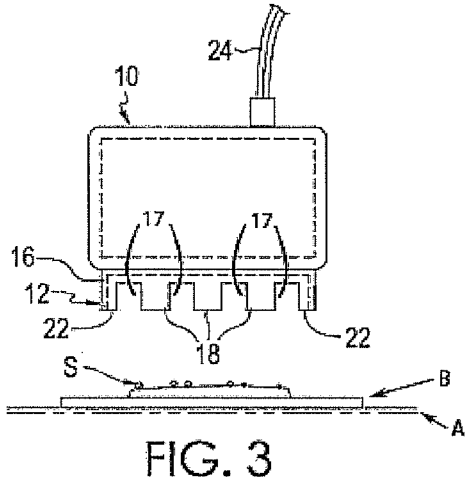
FIG. 3 is a front elevation of the embodiment shown in FIGS. 1 and 2.

FIG. 3 is a view of an apparatus of the invention shown above the strings S of the stringed instrument A. The electric vibration generator 10 is attached to the string cradle 12. On the string cradle 12, one of the side walls 16 and flanges 18 extending away from the side wall 16 are shown. An electrical power cord 24 extending from the electric vibration generator 10 and capable of accepting electric current from an external source is shown.

Figure 4:
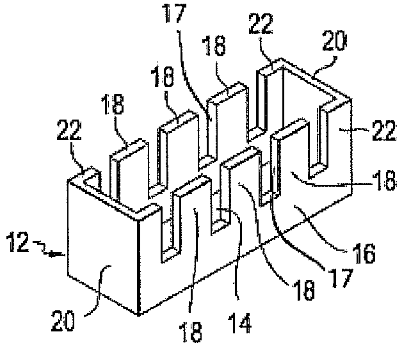
FIG. 4 is a perspective view of a string cradle portion of the apparatus of FIGS. 1-3.
Figure 5:
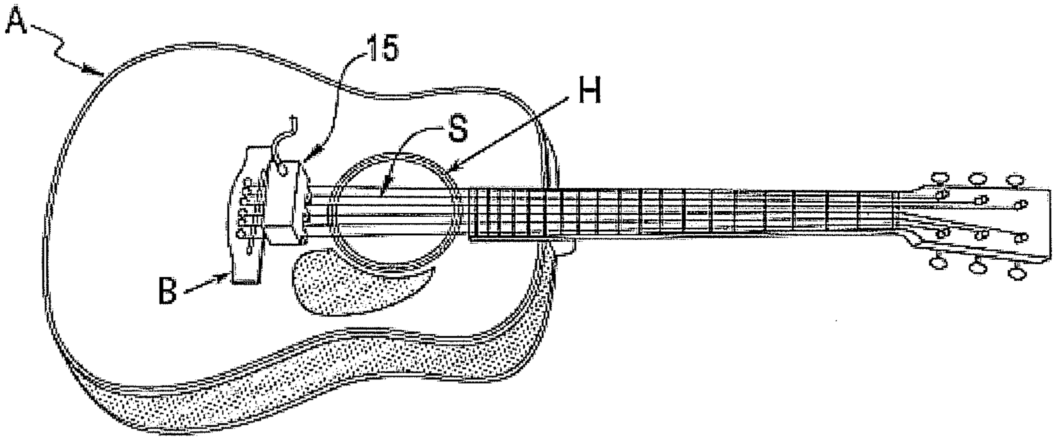
FIG. 5 is a perspective view of a stringed instrument fitted with a second embodiment of a vibration generator-string cradle in accordance with the present invention.

FIG. 4 is a view of a string cradle 12 of an apparatus of the invention. The string cradle 12 has a main body portion 14, side walls 16, and flanges 18 extending away from the side walls 16. The string cradle 12 also has end members 20 extending from the main body portion 14. The end members 20 are connected to end flanges 22.

Figure 6:
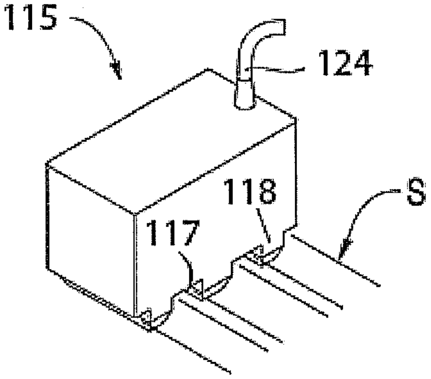
FIG. 6 is a perspective view of an integral vibration generator-string cradle in accordance with the second embodiment.
Figure 7:
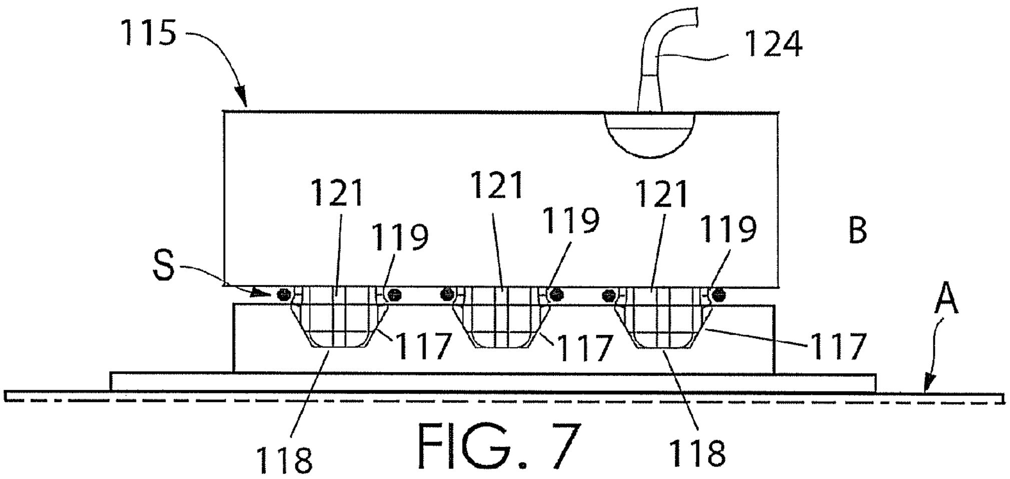
FIG. 7 is a front elevation of the second embodiment shown in FIGS. 5 and 6.

FIGS. 5-8 illustrate an alternate embodiment of the present invention wherein the vibration generator and a portion of the string cradle are enclosed together in a rubber-like housing, creating an integral vibration generator 115. The integrated apparatus 115 is shown attached to the strings S between the bridge B and the sound hole H of the guitar A in FIG. 5. Although the apparatus 115 is shown placed proximate to the bridge B of the guitar A, it may be placed on the strings at any location between the bridge and neck of the guitar. FIGS. 6 and 7 illustrate the apparatus 115 detachably attached to the strings S of the guitar with an external power source supplying power by means of electrical power cord 124. As shown, two strings are accommodated in the grooves 117 formed between flanges 118. It should be appreciated that the groove formed between the flanges may vary in size thereby varying the number of strings that may be accommodated in the grooves. Accordingly, the number of grooves 117 may vary based on the number of flanges 118 included in the string cradle 115.

As shown in FIG. 7, each side surface defining the groove 117 is sloped outwardly from the outer extremity of each flange, and terminates in a longitudinal indentation 119 dimensioned to receive a string S. It will be appreciated that the sloped sides of the flanges 118 forming the grooves 117 assist in insuring that the strings are cammed into place in a respective indentation 119 when the integral string cradle-vibration generator apparatus 115 is fitted onto the stringed instrument A.

Figure 8:
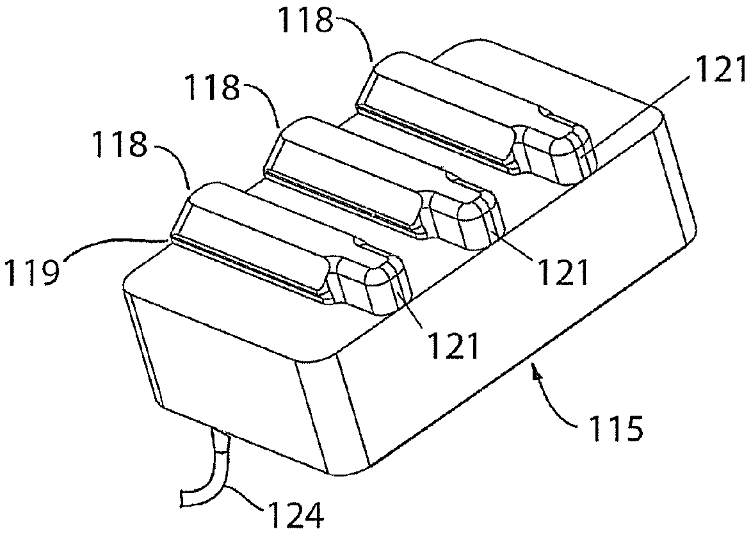
FIG. 8 is a perspective view of the integrated vibration generator-string cradle construction in accordance with the second embodiment, illustrating the flanges having tapered leading edges.

FIG. 8 further illustrates the flanges 118 of the device 115 and the grooves 117 formed between the flanges. At least one leading edge 121 of each flange 118 is tapered to facilitate low friction contact with the bridge B in those instances where it is desirable to have that contact.

Except as may be expressly otherwise indicated, the article "a" or "an" if and as used herein is not intended to limit, and should not be construed as limiting, the description or a claim to a single element to which the article refers. Rather, the article "a" or "an" if and as used herein is intended to cover one or more such elements, unless the text expressly indicates otherwise.

This invention is susceptible to considerable variation in its practice. Therefore, the foregoing description is not intended to limit, and should not be construed as limiting, the invention to the particular exemplifications presented hereinabove.

The invention claimed is:

1. Apparatus for seasoning a stringed musical instrument, comprising:

a string cradle having a plurality of outwardly extending flanges, each flange dimensioned for extension between strings of a stringed musical instrument; and means for transmitting mechanical vibrations to the strings through the flanges;

a groove between adjacent flanges, each grove defined by opposing side walls; and means for gripping each string against a side wall of a groove to enhance the transmission of the vibrations to the strings;

wherein the gripping means comprises indentations along the side wall of the corresponding groove dimensioned to receive a string.

2. The apparatus recited in claim 1 wherein the side wall of each groove tapers outwardly in a direction away from the outer extremity of each flange.

3. The apparatus recited in claim 1 wherein the means for transmitting vibrations comprises a vibration generator mounted with the string cradle.

4. Apparatus for seasoning a stringed musical instrument, comprising:

a string cradle having a plurality of outwardly extending flanges, each flange dimensioned for extension between strings of a stringed musical instrument; and means for transmitting mechanical vibrations to the strings through the flanges;

wherein the means for generating vibrations comprises a vibration generator mounted with the string cradle; and wherein the vibration generator is mounted along an outer surface of the string cradle opposite the extending flanges.

5. The apparatus recited in claim 4 wherein the vibration generator and the string cradle are formed together as an integral unit.

6. The apparatus recited in claim 4 wherein the flanges are generally parallel and each is generally equidistantly spaced from adjacent flanges.

7. A method for seasoning a stringed musical instrument comprising the steps of:

providing a stringed musical instrument to be seasoned;

providing a string cradle having plurally outwardly extending flanges, each flange dimensioned for extension between adjacent strings of the stringed musical instrument;

fitting the string cradle into engagement with the strings of the stringed musical instrument by inserting each flange into engagement with at least one string of the stringed musical instrument;

inserting each flange into engagement with two strings of the stringed musical instrument, each on an opposite side of each flange; and transmitting mechanical vibrations to the strings through the flanges.

8. The method recited in claim 7 wherein the string cradle defines a groove between adjacent flanges with each groove defined by opposing side walls, and further comprising the step of gripping each string against a side wall to enhance the transmission of vibrations to the strings.

9. A method for seasoning a stringed musical instrument comprising the steps of:

providing a stringed musical instrument to be seasoned;

providing a string cradle having plurally outwardly extending flanges, each flange dimensioned for extension between adjacent strings of the stringed musical instrument;

fitting the string cradle into engagement with the strings of the stringed musical instrument by inserting each flange into engagement with at least one string of the stringed musical instrument; and transmitting mechanical vibrations to the strings through the flanges;

wherein the string cradle defines a groove between adjacent flanges with each groove defined by opposing side walls, and further comprising the step of gripping each string against a side wall to enhance the transmission of vibrations to the strings; and wherein the gripping step further comprises inserting each string into an indentation along the respective side wall.

10. The method recited in claim 9 further comprising the step of tapering the side walls of each groove outwardly in a direction away from the outer extremity of each flange.

11. The method recited in claim 9 further comprising the step of integrally packaging a vibration generator with the string cradle.

12. A method for seasoning a stringed musical instrument comprising the steps of:

providing a stringed musical instrument to be seasoned;

providing a string cradle having plurally outwardly extending flanges, each flange dimensioned for extension between adjacent strings of the stringed musical instrument;

fitting the string cradle into engagement with the strings of the stringed musical instrument by inserting each flange into engagement with at least one string of the stringed musical instrument; and transmitting mechanical vibrations to the strings through the flanges;

wherein the stringed musical instrument comprises a bridge, and wherein the string cradle is fitted to the strings at a point spaced from the bridge.

13. Apparatus for seasoning a stringed musical instrument having a known spacing dimension between strings, the apparatus comprising:

a vibration transmission member having plural projections, the lengthwise dimension of the projections permitting extension through the strings when the vibration transmission member is positioned over the strings, the projections spaced apart by the known spacing dimension of the stringed musical instrument; and means along each projection for gripping each string of the stringed musical instrument against a corresponding one of the projection;

wherein vibrations passing from the vibration transmission member through the projections further cause vibrations in the strings and resulting seasoning of the stringed musical instrument; and wherein each projection engages two strings, each on opposite sides thereof.

14. The apparatus recited in claim 13 wherein each projection is defined by opposing sloped side walls, with the gripping means comprising elongated indentations dimensioned to receive a corresponding string.

15. The apparatus recited in claim 13 wherein the vibration transmission member comprises:

a string cradle with the projections extending therefrom; and an electrically-powered vibrator fitted with the string cradle.

16. The apparatus recited in claim 15 wherein the vibration generator and the string cradle are integrally packaged as a unit.

17. Apparatus for seasoning a stringed musical instrument having a known spacing dimension between strings, the apparatus comprising:

a vibration transmission member having plural projections, the lengthwise dimension of the projections permitting extension through the strings when the vibration transmission member is positioned over the strings, the projections spaced apart by the known spacing dimension of the stringed musical instrument; and means along each projection for gripping each string of the stringed musical instrument against a corresponding one of the projection;

wherein vibrations passing from the vibration transmission member through the projections further cause vibrations in the strings and resulting seasoning of the stringed musical instrument; and wherein the projections are tapered at least at one end.

* * * * *